(12) United States Patent
Villeneuve et al.

(10) Patent No.: US 8,085,822 B2
(45) Date of Patent: Dec. 27, 2011

(54) TUNABLE MODE-LOCKED LASER

(75) Inventors: Alain Villeneuve, Mont-Royal (CA); Nicolas Godbout, Verdun (CA)

(73) Assignee: Genia Photonics Inc., Laval (CA)

( * ) Notice: Subject to any disclaimer, the term of this patent is extended or adjusted under 35 U.S.C. 154(b) by 182 days.

(21) Appl. No.: 12/222,472

(22) Filed: Aug. 11, 2008

(65) Prior Publication Data
US 2009/0067456 A1 Mar. 12, 2009

Related U.S. Application Data

(60) Provisional application No. 60/935,353, filed on Aug. 9, 2007.

(51) Int. Cl.
*H01S 3/10* (2006.01)
*H01S 3/08* (2006.01)

(52) U.S. Cl. .............................. 372/20; 372/25; 372/102

(58) Field of Classification Search .................... 372/20, 372/25, 102
See application file for complete search history.

(56) References Cited

U.S. PATENT DOCUMENTS

| | | | |
|---|---|---|---|
| 5,627,848 A | 5/1997 | Fermann et al. | |
| 5,701,319 A | 12/1997 | Fermann | |
| 6,091,744 A * | 7/2000 | Sorin et al. | 372/20 |
| 6,141,359 A | 10/2000 | Cunningham et al. | |
| 6,510,167 B1 | 1/2003 | Jain et al. | |
| 6,631,145 B1 | 10/2003 | Tamura et al. | |
| 6,845,108 B1 * | 1/2005 | Liu et al. | 372/20 |
| 7,046,704 B2 | 5/2006 | Fischer | |
| 2006/0029110 A1 | 2/2006 | Cho et al. | |
| 2006/0159137 A1 | 7/2006 | Shah | |

FOREIGN PATENT DOCUMENTS
WO WO 03/043149 A1 5/2003

OTHER PUBLICATIONS

Okhotnikov, O.G. et al. Mode-Locked Ytterbium Fiber Laser . . . Optics Letters / vol. 28 No. 17 Sep. 2003 1522-1524 Finland.
Hideyuki, S. et al. Wavelenght Tunable Passively Mode Locked Bismuth . . . Elsevier Optics Communications 237 / Apr. 2004 399-403 USA.

* cited by examiner

*Primary Examiner* — Patrick Stafford (57) ABSTRACT

A tunable laser cavity for selectively emitting laser light having a first wavelength and a second wavelength using pump light emitted by a pump light source. The tunable laser cavity includes an optical resonator, the optical resonator having a configuration, optical properties and dimensions such that a first round-trip time of the laser light having the first wavelength in the optical resonator differs from a second round-trip time of the laser light having the second wavelength in the optical resonator; a gain medium inserted in the optical resonator, the gain medium being responsive to the pump light for converting the pump light to the laser light; a pump light input port optically coupled to the gain medium for receiving the pump light and conveying the pump light to the gain medium; an optical intensity modulator inserted in the optical resonator for absorbing a portion of the laser light as the laser light propagates back and forth in the optical resonator, the optical intensity modulator having a light absorption coefficient that is modulated with a modulation period, the modulation period being selectively adjustable between a first modulation period value and a second modulation period value, the first and second round-trip times being substantially equal to a respective integer multiple of respectively the first and second modulation period values; and an output port for releasing the laser light from the optical resonator.

26 Claims, 7 Drawing Sheets

TUNABLE MODE-LOCKED LASER

The Present Application claims priority from U.S. Provisional Patent Application Ser. No. 60/935,353 filed Aug. 9, 2008.

FIELD OF THE INVENTION

The present invention relates to the general field of optics, and is particularly concerned with a mode-locked laser.

BACKGROUND

Mode-locked lasers, for example, mode-locked fiber lasers, generate relatively short pulses of laser light. To achieve the generation of such pulses, many methods are used in the prior art. For example, pulses may be generated by inserting in the laser cavity a saturable absorber. The saturable absorber is a material that preferentially transmits light having high intensity. Therefore, in these embodiments, any random fluctuation in the intensity of the light propagating within the laser cavity is preferentially selected. Since these lasers include highly reflective mirrors at both ends thereof, even relatively inefficient intensity selection will result in the formation of pulses as light travels back and forth in the laser cavity. A disadvantage of these mode-locked lasers is that they are typically not tunable in wavelength.

In another type of mode-locked lasers, the saturable absorber is replaced by an optical component that periodically changes its absorption coefficient at the lasing frequency. For example, this may be achieved by using acousto-optic modulators, or electro-optic modulators. By selecting the frequency at which the absorption coefficient is modulated, it is possible to select for light traveling within the lasing cavity in pulses having a round trip time around the cavity that is a multiple of the frequency at which the absorption coefficient is modulated. Therefore, only a few or one pulse is selected within the cavity, which produces the pulsed output. Conventional mode-locked lasers using this technology are also typically not adjustable in wavelength.

To produce tunable mode-locked lasers, Sorin et al., in U.S. Pat. No. 6,091,744 issued on Jul. 18, 2000, have proposed using a laser in which one end thereof includes a plurality of fiber Bragg gratings longitudinally spaced apart from each other, each fiber Bragg grating being reflective at a respective wavelength. A tunable filter is inserted in the laser cavity. By selecting a specific wavelength using the tunable filter, reflection occurs at a specific one of the fiber Bragg gratings, which provides selection of wavelength in discrete steps. Such lasers have been shown to be advantageous in telecommunication applications in which specific wavelengths are used to transmit information over different channels. However, these set-ups require the use of a tunable filter and are therefore relatively expensive. Furthermore, tunable filters are typically relatively fragile components and, therefore, the resulting lasers are not very robust. Yet, furthermore, this laser is not continuously adjustable in wavelength, which may prove a disadvantage in many applications.

PCT Publication Ser. No. WO 03/043149 published on May 22, 2003 by Duguay et al. describes an electronically tunable laser using wavelength selective reflectors. In this tunable laser, a gain fiber is coupled at both ends thereof to optical fibers in which paired sets of fiber Bragg gratings are formed, the fiber Bragg gratings being reflective at different wavelengths and each of the fiber Bragg grating in each pair being located in a respective one of the optical fibers. The fiber Bragg gratings in each pair are all distanced from each other by a substantially similar distance and are longitudinally offset from each other. Therefore, a round trip time inside the cavity does not depend on the specific pair of fiber Bragg gratings that reflects each wavelength. An optical modulator is inserted between one of the optical fibers containing the fiber Bragg gratings and the gain medium so as to select times at which pulses are permitted to travel inside the laser. By properly selecting the delay between two successive moments at which pulses are allowed to pass through the modulator, pulses reflected by a specific pair of fiber Bragg gratings are preferentially selected in the tunable laser. Consequently, the wavelength of the laser light produced by the laser is selected using the optical modulator by selecting the pair of fiber Bragg gratings that is used to reflect the light. However, this arrangement is relatively complex and requires relatively precise timing of the modulator to operate properly.

Against this background, there exists a need in the industry to provide an improved mode-locked laser. An object of the present invention is therefore to provide such a device.

SUMMARY OF THE INVENTION

In a broad aspect, the invention provides a tunable laser cavity for selectively emitting laser light having a first wavelength and a second wavelength using pump light emitted by a pump light source. The tunable laser cavity includes an optical resonator, the optical resonator having a configuration, optical properties and dimensions such that a first round-trip time of the laser light having the first wavelength in the optical resonator differs from a second round-trip time of the laser light having the second wavelength in the optical resonator; a gain medium inserted in the optical resonator, the gain medium being responsive to the pump light for converting the pump light to the laser light; a pump light input port optically coupled to the gain medium for receiving the pump light and conveying the pump light to the gain medium; an optical intensity modulator inserted in the optical resonator for absorbing a portion of the laser light as the laser light propagates back and forth in the optical resonator, the optical intensity modulator having a light absorption coefficient that is modulated with a modulation period, the modulation period being selectively adjustable between a first modulation period value and a second modulation period value, the first and second round-trip times being substantially equal to a respective integer multiple of respectively the first and second modulation period values; and an output port for releasing the laser light from the optical resonator. When the gain medium is pumped with the pump light, modulating the optical intensity modulator at the first modulation period value produces laser light having the first wavelength and modulating the optical intensity modulator at the second modulation period value produces laser light having the second wavelength.

In some embodiments of the invention, the optical intensity modulator absorbs light with two different discrete absorption coefficients. For example, when the optical intensity modulator is in a first state, substantially all the light incoming at the optical intensity modulator is let through the optical intensity modulator and, when the optical intensity modulator is in a second state, a predetermined percentage of the light incoming at the optical intensity modulator is absorbed. In other embodiments of the invention, the optical intensity modulator has an absorption coefficient that is continuously variable within a predetermined interval of absorption coefficients.

The reader skilled in the art will readily appreciate the terminology "absorption coefficient" used herein does not imply that light is necessarily physically absorbed in the optical intensity modulator. Instead, this terminology only refers to the portion of the light incoming at the optical intensity modulator that is not transmitted to the remainder of the tunable laser. In some embodiments, the light is simply modulated in intensity through interference.

In some embodiments of the invention, the optical resonator includes two reflectors. However, in other embodiments of the invention, only one reflector is used and an optical circulator is provided for forming a loop that confines the laser light in the optical resonator.

In a specific embodiment of the invention, the optical resonator includes two fiber Bragg gratings that are substantially opposed to each other with the gain medium inserted therebetween. The fiber Bragg gratings may be chirped fiber Bragg gratings that allow for continuously adjusting the wavelength of the laser light by continuously changing the modulation period.

Advantageously, the proposed tunable laser cavity and the proposed tunable laser are manufacturable using commonly available components and techniques. Therefore, a tunable laser having a relatively wide tuning range may be manufactured at relatively low costs. In some embodiments of the invention, the tunable laser cavity and the tunable laser are manufactured using optical fibers, which produces relatively rugged lasers at relatively low costs.

In another broad aspect, the invention provides a tunable laser including the tunable laser cavity and a pump light source.

Other objects, advantages and features of the present invention will become more apparent upon reading of the following non-restrictive description of preferred embodiments thereof, given by way of example only with reference to the accompanying drawings.

DETAILED DESCRIPTION

Figure 1:
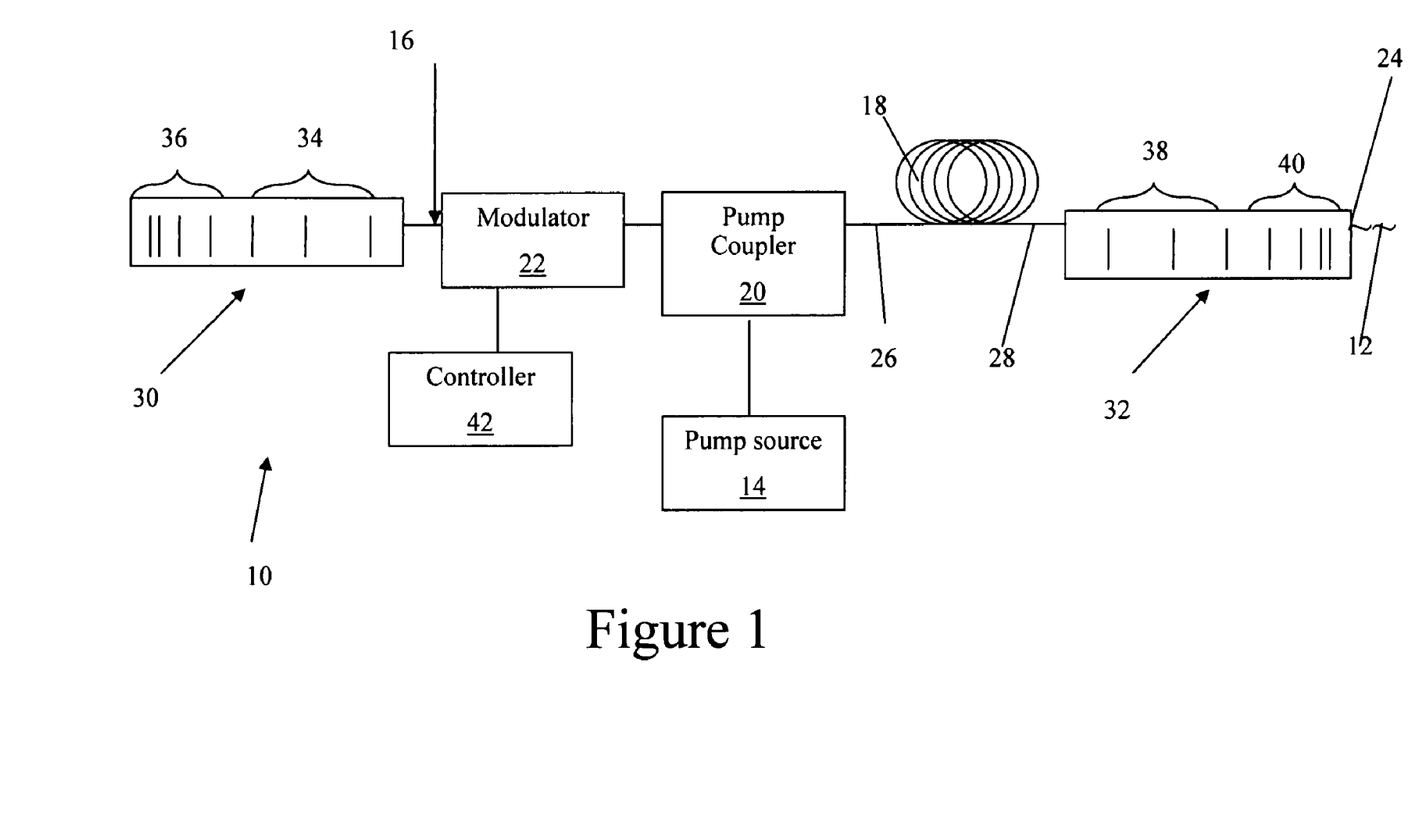
FIG. 1, in a schematic view, illustrates a tunable laser in accordance with an embodiment of the present invention.

Referring to FIG. 1, there is shown a tunable laser 10 for selectively emitting laser light 12 having a first wavelength and a second wavelength. While in some embodiments of the invention the tunable laser 10 is able emit laser light 12 having two different, discretely spaced apart, wavelengths, it is also within the scope of the invention to have a tunable laser 10 that is able to emit laser light 12 having more than two different wavelengths and laser light having a wavelength contained within a substantially continuous spectrum of wavelengths included in a predetermined wavelength interval.

The tunable laser 10 includes a pump light source 14 for emitting a pump light (not shown in the drawings). The tunable laser 10 also includes an optical resonator 16. The optical resonator 16 has a configuration, optical properties and dimensions such that a first round trip time of the laser light 12 having the first wavelength in the optical resonator 16 differs from a second round trip time of the laser light 12 having the second wavelength in the optical resonator 16. A gain medium 18 is inserted in the optical resonator 16 and is optically coupled to the pump light source 14. The gain medium 18 defines a gain medium first end 26 and a substantially opposed gain medium second end 28. The reader skilled in the art will understand that the terminology "gain medium first and second ends 26 and 28" does not imply that the gain medium 18 is necessarily rectilinear. For example, the gain medium may be formed by a rolled optical fiber. The gain medium 18 is responsive to the pump light for converting the pump light into the laser light 12. For example, the tunable laser 10 includes a pump light input port 20, also referred to as a pump coupler, optically coupled to the gain medium 18 for receiving the pump light and conveying the pump light to the gain medium 18.

An optical intensity modulator 22 is inserted in the optical resonator 16 for selectively absorbing a portion of the laser light 12 as the laser light 12 propagates back and forth in the optical resonator 16. The optical intensity modulator 22 has a light absorption coefficient that is modulated with a modulation period. The modulation period is selectively adjustable between a first modulation period value and a second modulation period value. The first and second round trip times are substantially equal to a respective integer multiple of respectively the first and second modulation period values.

The tunable laser 10 further includes an output port 24 for releasing the laser light 12 from the optical resonator 16. In some embodiments of the invention, a tunable laser cavity is provided instead of a tunable laser 10. The tunable laser cavity is simply a tunable laser 10 from which the pump light source 14 has been removed. The tunable laser cavity is usable with the pump light source 14 to build the tunable laser 10.

When the gain medium 18 is pumped with the pump light, modulating the optical intensity modulator 22 with the first modulation period value produces laser light having the first wavelength. Also, modulating the optical intensity modulator 22 with the second modulation period value produces laser light having the second wavelength.

Indeed, when the optical intensity modulator 22 is modulated, there will be periodic time intervals during which the optical intensity modulator 22 absorbs more light than at subsequent or previous moments. Since the laser light 12 is preferentially transmitted through the optical intensity modulator 22 at predetermined periodic time intervals, there will be a preference for the tunable laser 10 to operate with laser light pulses circulating within the optical resonator 16 in a manner such that these laser light pulses have a round trip time that is equal to the modulation period with which the optical intensity modulator is modulated, or a multiple of this modulation period. The configuration of the optical resonator 16 will therefore favor laser light pulses within the optical resonator 16 that have a round trip time corresponding respectively to the first and second wavelengths when the optical intensity modulator 22 is respectively modulated with the first and second modulation period values. The pulse duration of the pulses is governed by many factors, among which are the power provided by the pump light source 14, the dispersion in the whole tunable laser 10 and the exact wave shape of the modulation provided by the optical intensity modulator 22.

It has been found particularly advantageous in some embodiments of the invention to change the modulation period in steps instead of continuously. Indeed, lasers have a tendency to be locked at a predetermined wavelength when operating. Changing the modulation period in a substantially continuous manner from the first to the second modulation period values may then cause instabilities and, in turn, promote difficult mode locking at the second wavelength. By changing the modulation periods in discrete steps, tuning occurs faster using commonly available components.

In some embodiments of the invention, modulating the absorption coefficient of the optical intensity modulator 22 with a signal that is the sum of many single-frequency signals helps in modulating the output laser light 12. For example, by modulating the absorption coefficient with a signal that is the sum of two sinusoidal signals having frequencies that are close to each other, the laser light 12 has an output that varies sinusoidally with a frequency that is equal to the beat frequency of the two sinusoidal signals.

In the embodiment of the invention shown in FIG. 1, the optical resonator 16 includes a first reflector 30 and a second reflector 32. The first and second reflectors 30 and 32 are each reflective at about the first and second wavelengths. The first and second reflectors 30 and 32 are optically coupled to the gain medium 18 respectively through the gain medium first and second ends 26 and 28. It should be noted that, in some embodiments of the invention, other optical components are present between either of the reflectors 30 and 32 and the gain medium 18. Therefore, the first and second reflectors 30 and 32 need not be directly physically coupled to the gain medium 18.

The first reflector 30 includes a first reflector first portion 34 and a first reflector second portion 36 for reflecting respectively the laser light 12 having the first and second wavelengths. The first reflector first and second portions 34 and 36 are respectively spaced apart from the gain medium first end 26 by a first reflector first portion-to-gain medium distance and a first reflector second portion-to-gain medium distance. The first reflector first portion-to-gain medium distance is smaller than the first reflector second portion-to-gain medium distance. Therefore, the first reflector first portion 34 must be transmitting the second wavelength so that laser light having the second wavelength can reach the first reflector second portion 36.

Similarly, the second reflector 32 includes a second reflector first portion 38 and a second reflector second portion 40 for reflecting respectively the laser light 12 having the first and second wavelengths. The second reflector first and second portions 38 and 40 are respectively spaced apart from the gain medium second end 28 by a second reflector first portion-to-gain medium distance and a second reflector second portion-to-gain medium distance. The second reflector first portion-to-gain medium distance is smaller than the second reflector second portion-to-gain medium distance. Therefore, the second reflector first portion 38 must be transmitting the second wavelength so that laser light having the second wavelength can reach the second reflector second portion 40.

The first and second reflector first portions 34 and 38 are thus distanced from each other by a smaller distance than the first and second reflector second portions 36 and 40. This will cause the laser light 12 having the first wavelength to have a smaller first round trip time between the first and second reflector first portions 34 and 38 than the round trip time of the laser light 12 having the second wavelength between the first and second reflector second portions 36 and 40. In a specific embodiment of the invention, the first and second reflectors 30 and 32 each include a respective fiber Bragg grating. For example, the first reflector first and second portions 34 and 36 include respectively a first and a second fiber Bragg grating segment. In a specific embodiment of the invention, the first reflector first and second portions 34 and 36 each include a respective chirped fiber Bragg grating segment, which may be formed by having a single chirped fiber Bragg grating that defines both the first reflector first and second portions 34 and 36. In some specific embodiment of this latter construction, a tunable laser 10 having continuous wavelength selection is provided.

In some embodiments of the invention, the first wavelength is larger than the second wavelength and the chirped fiber Bragg gratings included in the first and second reflectors 30 and 32 also provides dispersion compensation. However, in alternative embodiments of the invention, the first wavelength is smaller than the second wavelength, which may be useful in embodiments in which other components of the proposed tunable laser 10 have anomalous dispersion properties.

In some embodiments of the invention, the first reflector 30 includes a relatively highly reflective chirped fiber Bragg grating. In these embodiments, substantially all the light incoming at the first reflector 30 is reflected back towards the gain medium 18. The second reflector 32 is an output chirped fiber Bragg grating and is not perfectly reflective so that some of the laser light 12 can be transmitted through the second reflector 32, which therefore provides the output port 24. Other manners of outputting the laser light 12 from the tunable laser 10 are within the scope of the invention and some of them are described in further details hereinbelow.

In some embodiments of the invention, the gain medium 18 has a first gain at the first wavelength and a second gain at the second wavelength. The first and second gains differ from each other. In these embodiments, to facilitate the production of laser light 12 having substantially similar powers at the two wavelengths, the first and second fiber Bragg grating segments included in the first reflector first and second portions 34 and 36 have respectively a first segment reflectivity and a second segment reflectivity. The first and second segment reflectivities are such that the tunable laser 10 has substantially constant gain at the first and second wavelengths. Therefore, it is possible to select the reflectivity of the first reflector first and second portions 34 and 36 so that the reflection of the laser light 12 at these first reflector first and second portions 34 and 36 compensates for the non-flat gain curve of the gain medium 18.

In some embodiments of the invention, one or both the first and second reflectors 30 and 32 are each made from a chirped fiber Bragg grating defining a variable group delay thereaolong. Therefore, the fiber Bragg grating segments included in different portions along the first and second reflectors 30 and 32 have different group delay characteristics, which affects the duration of laser light pulses produced using the tunable laser 10. Also, pulse characteristics other than the duration of the laser light pulses can be modified by selecting suitable group delays for fiber Bragg grating segments included in the first reflector first and second portions 34 and 36.

In yet other embodiments of the invention, the position of the second reflector first and second portions 38 and 40 is reversed with respect to the gain medium 18 while the first reflector first and second portions 34 and 36 remain in the same position. In these embodiments, wavelength selection of the laser light 12 is permitted by spacing apart the second reflector first and second portions 38 and 40 from each other by a greater distance than the distance by which the first reflector first and second portions 34 and 36 are spaced apart from each other. When chirped fiber Bragg gratings are used in the first and second reflectors 30 and 32, different group delay slopes are produced, and the laser operates with a group velocity dispersion that is the difference between the two group delay slopes. A mix between a soliton laser and a normal dispersion laser is thus formed that reduces or eliminates Kelly's side bends.

In some embodiments of the invention, the gain medium 18 includes a doped gain fiber. Such doped gain fibers are well known in the art and will therefore not be described in further details. It is also within the scope of the invention to manufacture tunable lasers 10 using any other suitable gain medium 18. Also, the pump light source 14 is any suitable pump light source 14 that can emit pump light that allows the gain medium 18 to produce the laser light 12 having both the first and second wavelengths. For example, the pump light source 14 includes a light emitting diode.

The pump light input port 20 is also any suitable pump light input port 20. For example, the pump light input port 20 includes a wave division multiplexer (WDM) that allows light having the first and second wavelengths to be freely transmitted, or substantially freely transmitted therethrough but which, through optical isolators or any other suitable means, substantially prevents light, and especially the laser light 12, from being transmitted back towards the pump light source 14. The WDM also allows for receiving pump light emitted by the pump light source 14 and transmitting this pump light into the optical resonator 16 and, more specifically, into the gain medium 18.

The optical intensity modulator 22 is any suitable component allowing variations in the transmission of the laser light 12 having the first and second wavelengths therethrough. Typically, the optical intensity modulator 22 takes the form of a component that is coupled to and inserted between the chirped fiber Bragg grating forming the first reflector 30 and the WDM multiplexer forming the pump light input port 20. However, any other physical configurations of the optical intensity modulator 22 are within the scope of the invention. In some embodiments of the invention, the optical intensity modulator 22 includes an electro-optic modulator.

In some embodiments of the invention, the optical intensity modulator 22 is a component that allows the laser light 12 to pass therethrough with two different absorption levels. For example, one level allows substantially all the light incoming at the optical intensity modulator 22 to pass therethrough. At a second level, a predetermined fraction of the light incoming at the optical intensity modulator 22 is not transmitted. In these embodiments, periodically changing the absorption coefficient of the optical intensity modulator 22 between the first level and the second level preferentially selects a laser light pulse that travels through the optical resonator 16 as described hereinabove.

The reader skilled in the art will readily appreciate that the optical intensity modulator 22 need not absorb all or a large fraction of the light circulating within the tunable laser 10 for the mode locking effect provided by the optical intensity modulator 22 to be provided. Indeed, only relatively small variations in the absorption coefficient are sufficient in some embodiments of the invention to produce the desired effect.

In some embodiments of the invention, the optical intensity modulator 22 includes a variable attenuation modulator. In opposition to the previously described optical intensity modulator, the variable attenuation modulator allows for a substantially continuous variation in the absorption coefficient of the optical intensity modulator 22 over a predetermined absorption range. In this embodiment, the power of the laser light 12 may therefore be regulated using the optical intensity modulator 22, in addition to being regulated using the power of the pump light source 14.

As illustrated in FIG. 1, in some embodiments of the invention, the tunable laser 10 includes a controller 42 for controlling the modulation period of the optical intensity modulator 22. Typically, fiber Bragg gratings, such as the fiber Bragg gratings usable in the first and second reflectors 30 and 32, do not have ideal, theoretically predictable, reflection spectra at different locations therealong due to manufacturing defects. However, once a fiber Bragg grating has been characterized, it is possible to map the distance from one end of the fiber Bragg grating to each location therealong and to associate with each of these locations a specific wavelength that is reflected. Therefore, by characterizing the first and second reflectors 30 and 32 in this manner, the controller 42 can be programmed to select precisely the wavelength at which the laser light 12 will be emitted for a specific tunable laser 10 as the modulation period can then be selected to achieve this wavelength.

Also, the group delay characteristics of chirped fiber Bragg gratings are not perfect. Imperfections create a group delay ripple which may cause unwanted effects in the pulsed laser light 12. A ratio between the group delay ripple and the group delay as a function of frequency is herein referred to as the ratio spectrum. The pulses of laser light 12 produced by the tunable laser 10 have a pulse spectrum. It is preferable to manufacture the chirped Bragg gratings with sufficient precision that the ratio spectrum is substantially disjoint from the pulse spectrum. In other words, regions of the ratio spectrum in which there is a significant power should be separate from regions of pulse spectrum at which there is a significant power.

Figure 2:
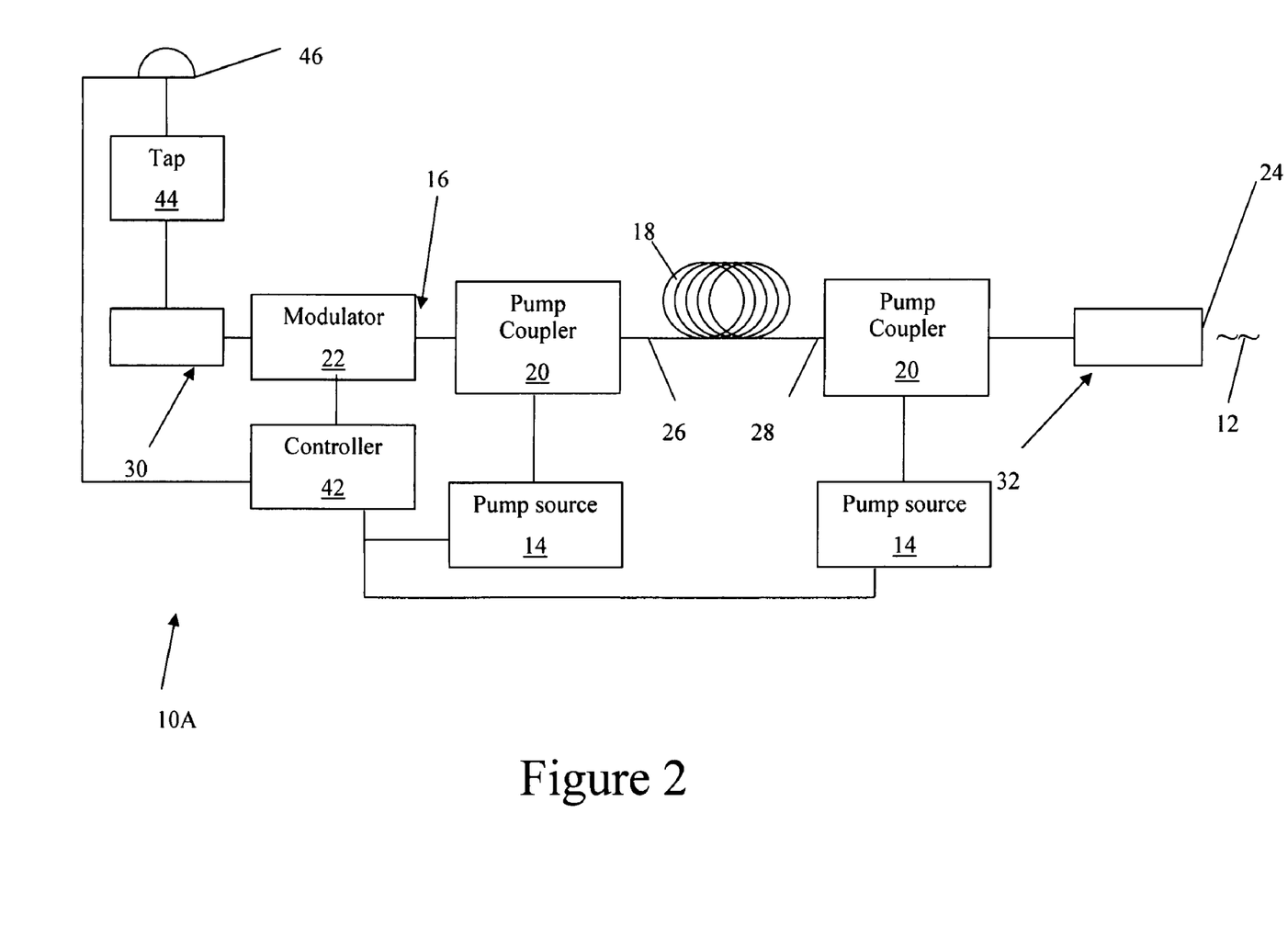
FIG. 2, in a schematic view, illustrates a tunable laser in accordance with an alternative embodiment of the present invention.

FIG. 2 illustrates an alternative tunable laser 10A. The tunable laser 10A has many components that are substantially similar to those of the tunable laser 10. These components will therefore not be described in further details.

As seen from FIG. 2, the tunable laser 10A differs from the tunable laser 10 in that it includes two pump light sources 14, each coupled to the gain medium 18 through a respective pump light input port 20. Also, it is within the scope of the invention to have more than two pump light sources 14. In addition, a tap 44 is provided, for example at an end of the first reflector 30 opposed to the gain medium 18, so that a photodiode 46, or any other suitable light intensity measurement device, can be used to measure the tapep light and feed this light intensity to the controller 42. The controller 42 is therefore connected to the photodiode 46 so that light intensity measurements can be transmitted by the photodiode 46 to the controller 42. The controller 42 is also operatively coupled to the pump light source 14 for controlling the intensity of the pump light. The controller 42 is then used in a feedback loop to control the power provided by the pump light sources 14 in response to light intensity measurements to obtain a predetermined power for the laser light 12.

Figure 3:
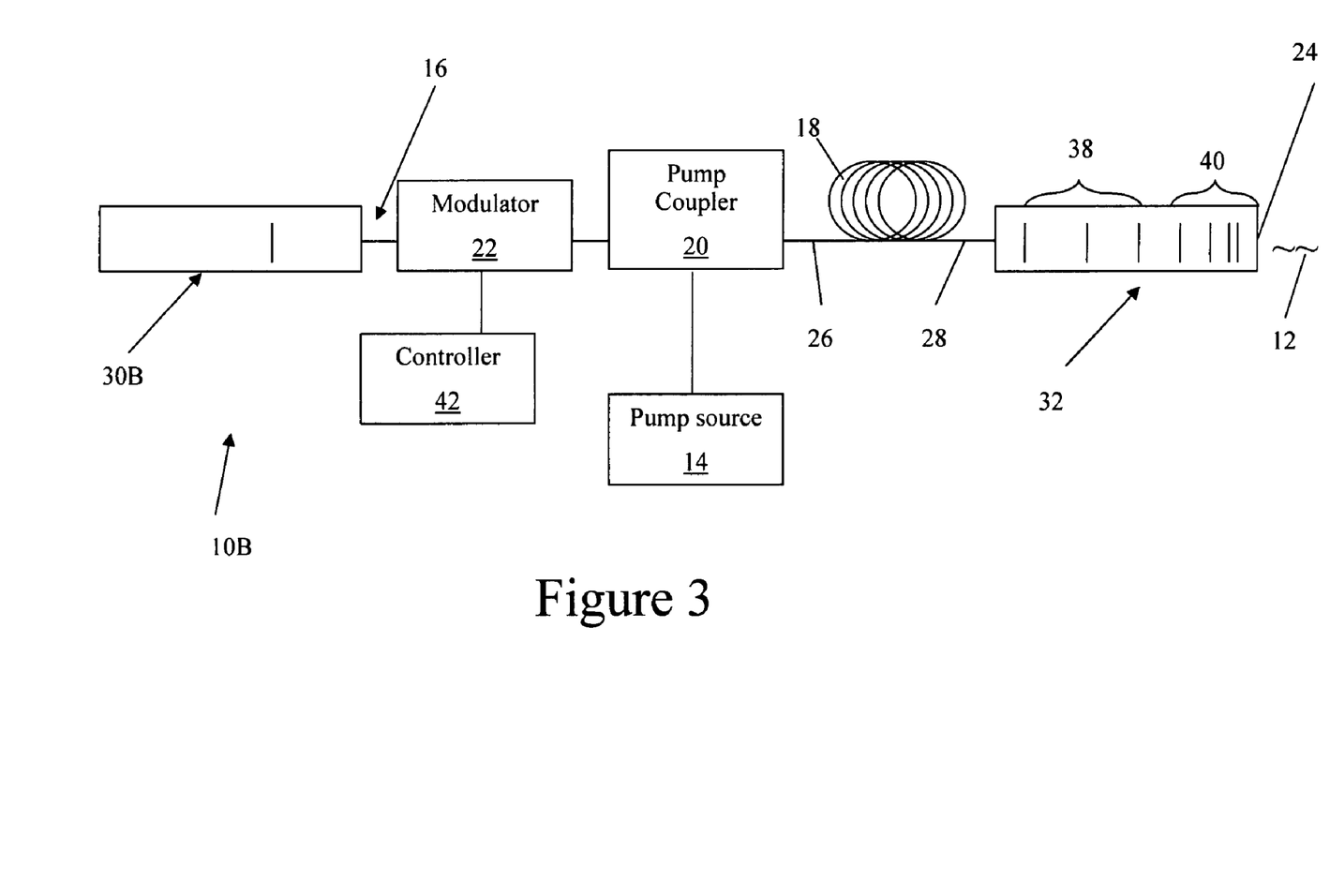
FIG. 3, in a schematic view, illustrates a tunable laser in accordance with another alternative embodiment of the present invention.

FIG. 3 illustrates yet another tunable laser 10B. The tunable laser 10B being similar also to the tunable laser 10. A difference that occurs in the tunable laser 10B is that an alternative first reflector 30B is used. The alternative first reflector 30B is such that the first reflector 30B reflects the laser light 12 having both the first and second wavelengths at substantially similar first reflector-to-gain medium distances from the gain medium first end 26. For example, this is achieved by using a mirror instead of a fiber Bragg grating in the first reflector 30B.

Figure 4:
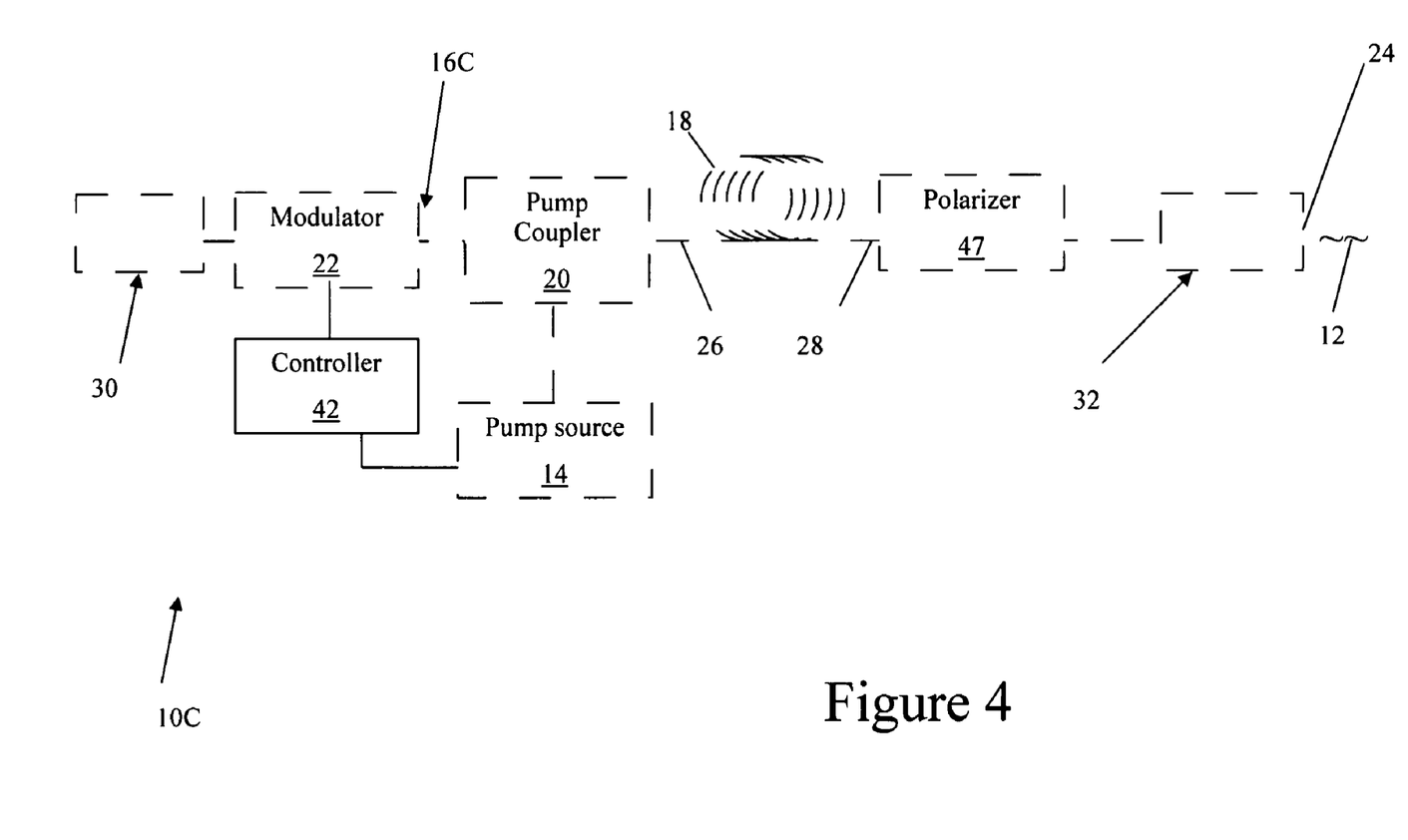
FIG. 4, in a schematic view, illustrates a tunable laser in accordance with yet another alternative embodiment of the present invention.

FIG. 4 illustrates yet another tunable laser 10C in which the optical resonator 16, the gain medium 18 and optical intensity modulator 22 are all polarization maintaining, as illustrated by the dashed representation of these components. Therefore, the tunable laser 10C is able to produce polarized laser light 12. To select the polarization, a polarizer 47 is inserted in the optical resonator 16C for polarizing the laser light 12.

Figure 5:
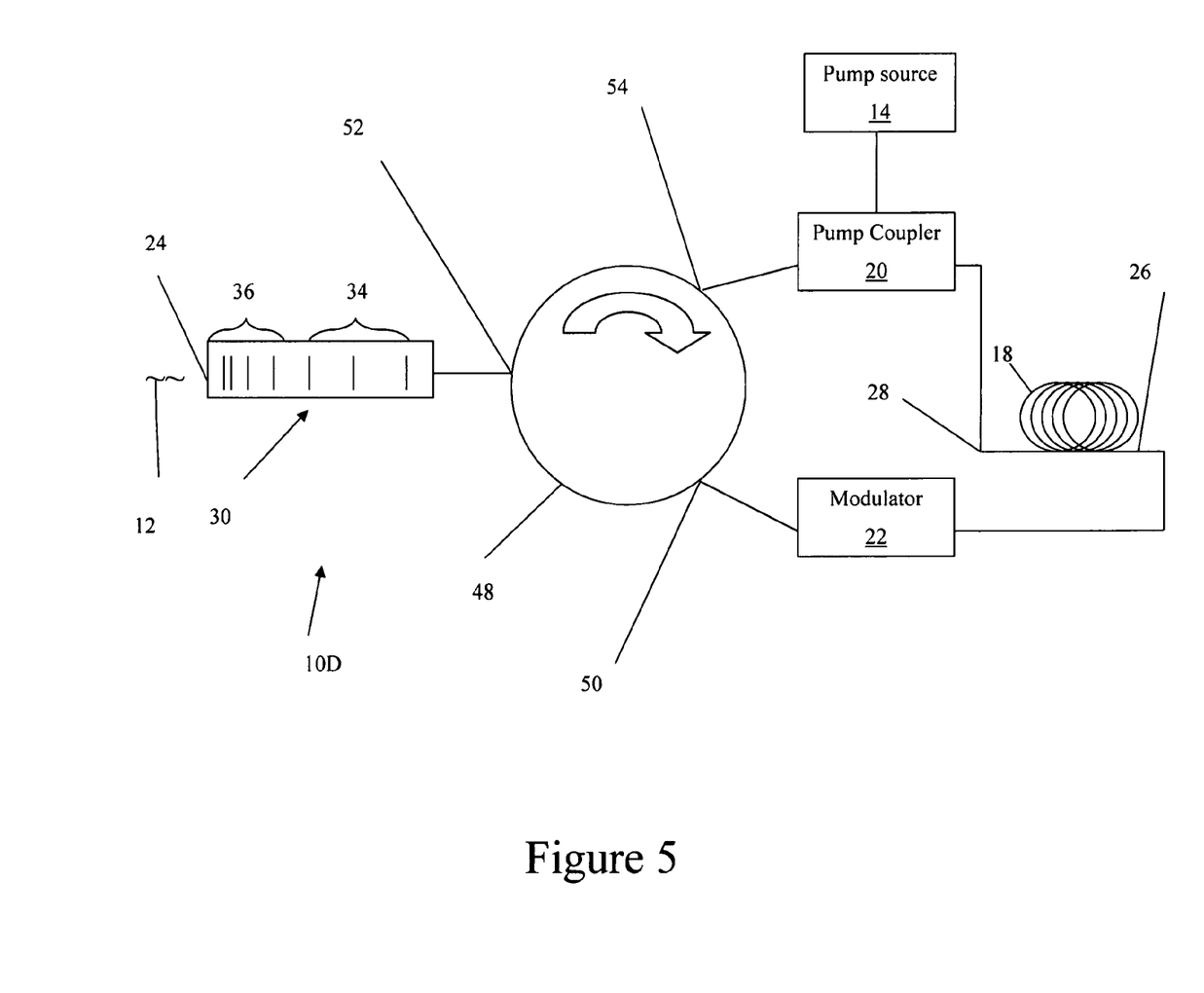
FIG. 5, in a schematic view, illustrates a tunable laser in accordance with yet another alternative embodiment of the present invention.

FIG. 5 illustrates yet another tunable laser 10D. The tunable laser 10D uses only a single reflector 30 instead of the first and second reflectors 30 and 32. The resonance in the optical resonator 16D is provided by using an optical circulator 48. The optical circulator 48 includes a circulator first port 50, a circulator second port 52 and a circulator third port 54. The optical circulator 48 is configured in a manner such that the laser light incoming at the circulator first port 50 is emitted at the circulator second port 52, laser light incoming at the circulator second port 52 is emitted at the circulator third port 54 and laser light incoming at the circulator third port 54 is emitted at the circulator first port 50. The circulator first port 50 is optically coupled to the gain medium 18 through the gain medium first end 26 with the optical intensity modulator 22 inserted between the gain medium first end 26 and the circulator first port 50. The circulator second port 52 is optically coupled to the reflector 30 and the circulator third port 54 is optically coupled to the gain medium 18 through the gain medium second end 28 with the pump light input port 20 inserted between the gain medium second end 28 and the circulator third port 54. The reflector 30 is a reflector similar to the first and second reflectors 30 and 32 and has a structure and a function substantially similar to that of the first and second reflectors 30 and 32. In this embodiment, the reflector 30 allows for the emission of the laser light 12 by the laser 10D by letting a portion of the laser light 12 to be transmitted through the reflector 30. In this embodiment of the invention, a unidirectional loop is created, which reduces losses in the tunable laser 10D caused by the optical intensity modulator 22.

Figure 6:
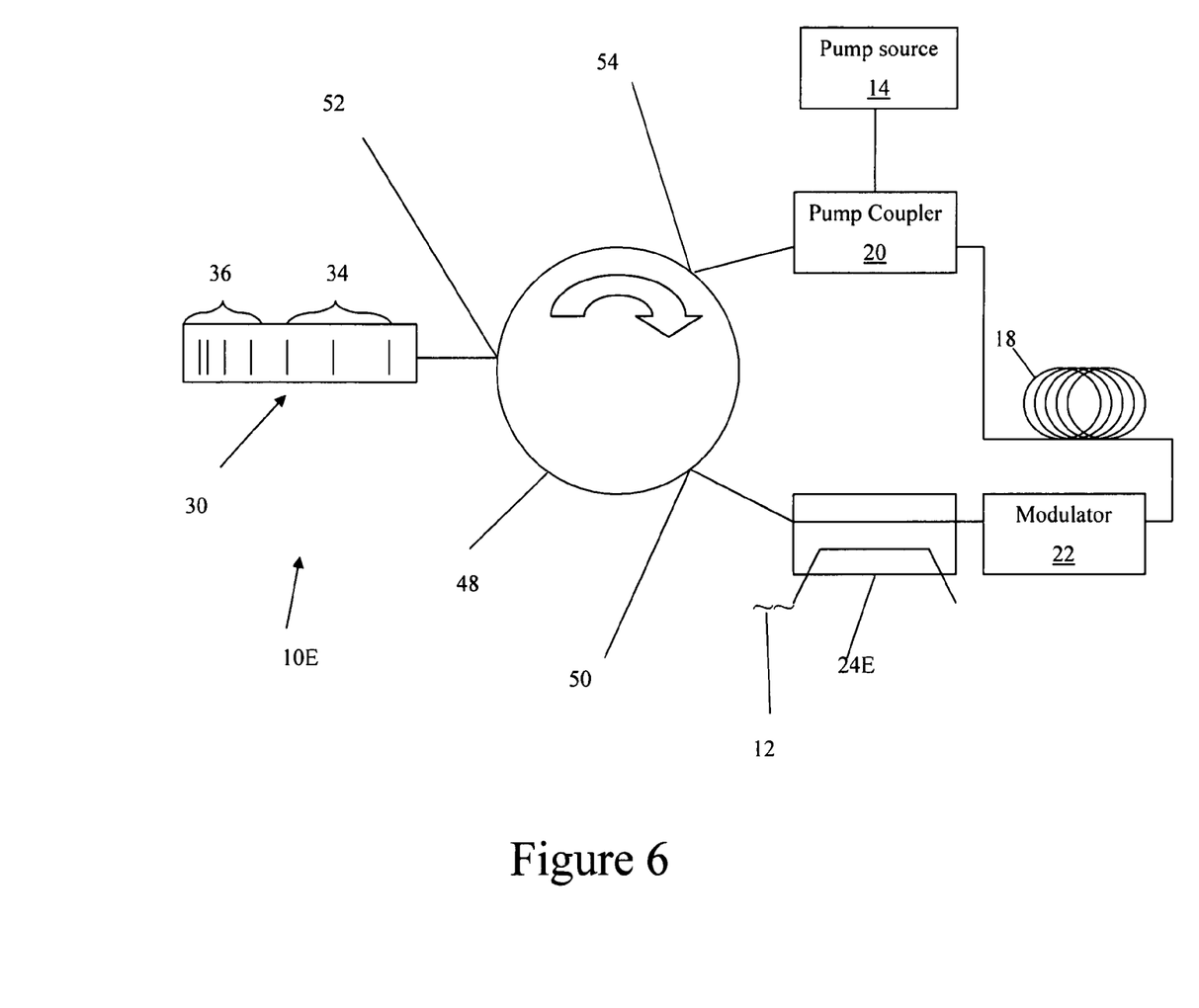
FIG. 6, in a schematic view, illustrates a tunable laser in accordance with yet another alternative embodiment of the present invention.

In yet another embodiment of the invention, a tunable laser 10E shown in FIG. 6 is provided. The tunable laser 10E includes an alternative output port 24E inserted between the optical intensity modulator 22 and the circulator first port 50. The tunable laser 10E has a configuration substantially similar to the configuration of the tunable laser 10D, with the exception that the reflector 30 is highly reflective and, therefore, does not allow for laser light 12 to be transmitted therethrough. Instead, an output port 24E in the form of a fiber coupler or, in other words, a tap, is provided for tapping into the tunable laser 10E and therefore releasing the tunable laser light 12.

Figure 7:
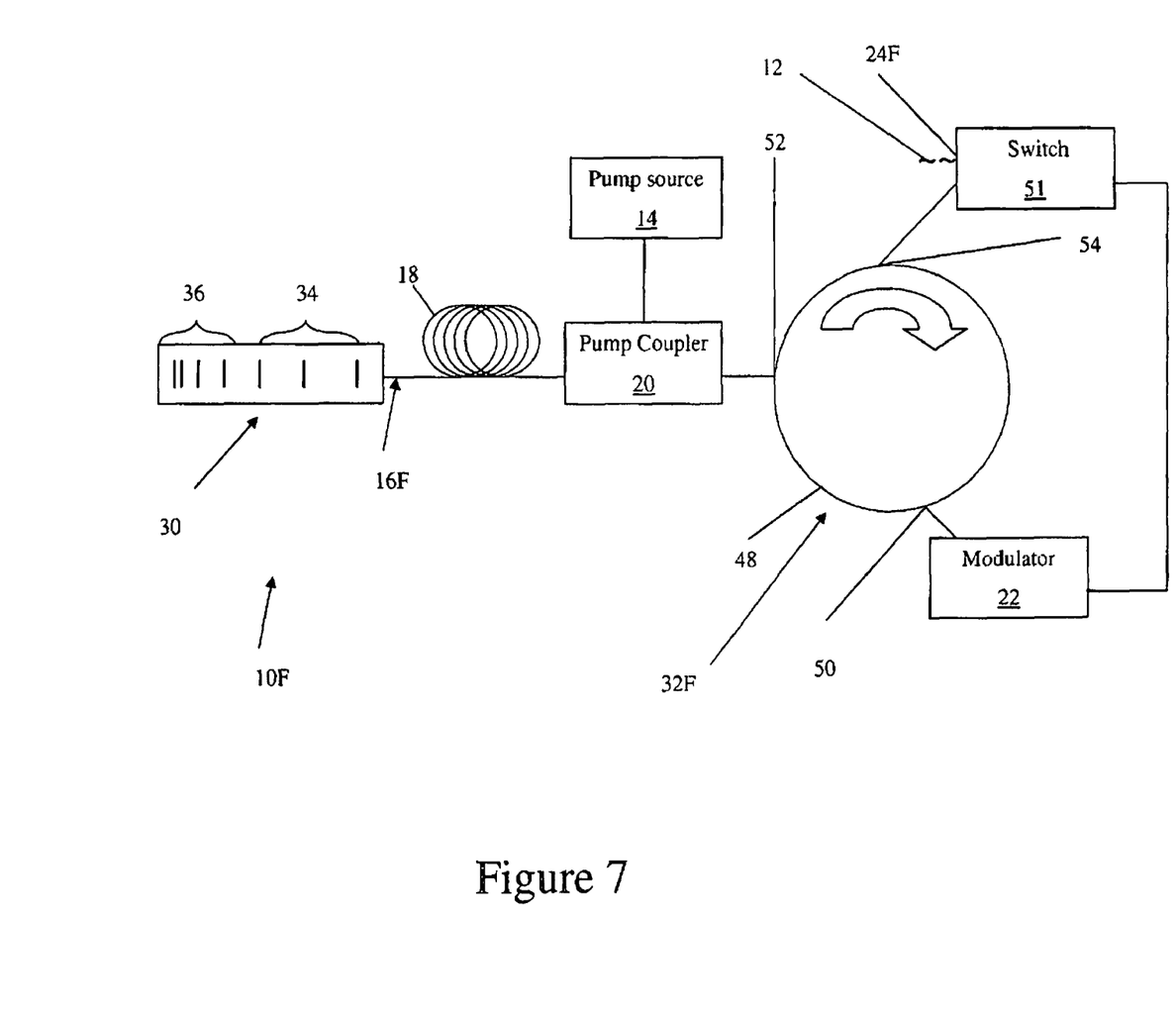
FIG. 7, in a schematic view, illustrates a tunable laser in accordance with yet another alternative embodiment of the present invention.

FIG. 7 illustrates yet another geometry for a tunable laser 10F in which the second reflector 32F includes an optical circulator 48 for receiving the laser light 12 from the gain medium 18 and returning the laser light back 12 to the gain medium 18. In this embodiment, the circulator first port 50 is optically coupled to the circulator third port 54 with an optical switch 51 and the optical intensity modulator 22 inserted therebetween. The circulator second port 52 is optically coupled to the first reflector 30 with the gain medium 18 and the pump light input port 20 inserted therebetween. Advantageously, various optical components can be inserted in the loop formed between the circulator first and third ports 50 and 54 to allow emission of the laser light 12, modulation of the intensity of the laser light 12 and any other conditioning or characterization of the laser light 12.

The optical switch 51 defines the output port 24F and is usable for selectively releasing the laser light 12 from the optical resonator 16F and confining the laser light 12 in the optical resonator 16F. More specifically, in one state of the optical switch 51, all the light incoming at the switch 51 is fed back into the optical resonator 16F. This allows for build up of laser light power inside the optical resonator 16F. When a pulse is to be let out of the optical resonator 16F, the switch 51 is switched to the other state in which a part or all of the light incoming at the switch 51 is output at another port that forms the output port 24F.

In the above-described tunable lasers 10 to 10F, using suitable components allows for variations in the duration of the laser light pulses by varying the intensity of these laser light pulses. In turn, this intensity is adjustable by varying many controllable variables, such as the duration and time evolution profile of the optical intensity modulation provided by the optical intensity modulator 22 and the power provided by the pump light source 14. In some embodiments, the first reflector 30, the second reflector 32 or both the first and second reflectors 30 and 32 have an adjustable dispersion, which is then also usable to change the laser light pulses shape and duration. It should be noted that the variations in the pulse duration is achievable without changing the pulse repetition frequency.

While some embodiments of a tunable laser have been described hereinabove, it is within the scope of the invention to have many other variants. Also, it is within the scope of the invention to use many concepts associated with lasers to operate the proposed tunable lasers in different operation ranges. For example, the proposed laser may be Q switched and, as described hereinabove in a specific embodiment, cavity dumping may be used.

Although the present invention has been described hereinabove by way of preferred embodiments thereof, it can be modified, without departing from the spirit and nature of the subject invention as defined in the appended claims.

What is claimed is:

1. A tunable laser cavity for selectively emitting laser light having a first wavelength and a second wavelength using pump light emitted by a pump light source, said tunable laser cavity comprising:

an optical resonator, said optical resonator including a reflector, said reflector including a reflector first portion and a reflector second portion for reflecting respectively said laser light having said first and second wavelengths, said reflector first and second portions being substantially transparent respectively at said second and first wavelengths, said reflector first and second portions being spatially spaced apart from each other such that a first round-trip time of said laser light having said first wavelength in said optical resonator differs from a second round-trip time of said laser light having said second wavelength in said optical resonator;

a gain medium inserted in said optical resonator, said gain medium being responsive to said pump light for converting said pump light to said laser light;

a pump light input port optically coupled to said gain medium for receiving said pump light and conveying said pump light to said gain medium;

an optical intensity modulator inserted in said optical resonator for absorbing a portion of said laser light as said laser light propagates in said optical resonator, said optical intensity modulator having a light absorption coefficient that is modulated with a modulation period, said modulation period being selectively adjustable between a first modulation period value and a second modulation period value, said first and second round-trip times being substantially equal to a respective integer multiple of respectively said first and second modulation period values; and an output port for releasing said laser light from said optical resonator;

whereby, when said gain medium is pumped with said pump light, modulating said optical intensity modulator at said first modulation period value produces laser light having said first wavelength and modulating said optical intensity modulator at said second modulation period value produces laser light having said second wavelength.

2. A tunable laser cavity as defined in claim 1, wherein said reflector is a first reflector;
said gain medium defines a gain medium first end and a substantially opposed gain medium second end;
said optical resonator includes a second reflector, said first and second reflectors being each reflective at both said first and second wavelengths, said first and second reflectors being optically coupled to said gain medium respectively through said gain medium first and second ends.

3. A tunable laser cavity as defined in claim 2, wherein said reflector first and second portions are respectively a first reflector first portion and a first reflector second portion, said first reflector first and second portions being respectively spaced apart from said gain medium first end by a first reflector first portion-to-gain medium distance and a first reflector second portion-to-gain medium distance, said first reflector first portion-to-gain medium distance being smaller than said first reflector second portion-to-gain medium distance.

4. A tunable laser cavity as defined in claim 3, wherein said second reflector reflects said laser light having both said first and second wavelengths at substantially similar second reflector-to-gain medium distances from said gain medium second end.

5. A tunable laser cavity as defined in claim 3, wherein said second reflector includes a second reflector first portion and a second reflector second portion for reflecting respectively said laser light having said first and second wavelengths, said second reflector first and second portions being respectively spaced apart from said gain medium second end by a second reflector first portion-to-gain medium distance and a second reflector second portion-to-gain medium distance, said second reflector first portion-to-gain medium distance being smaller than said second reflector second portion-to-gain medium distance, said second reflector first portion transmitting said second wavelength.

6. A tunable laser cavity as defined in claim 3, wherein said first reflector includes a fibre Bragg grating.

7. A tunable laser cavity as defined in claim 3, wherein said first reflector first and second portions include respectively a first fibre Bragg grating segment and a second fibre Bragg grating segment.

8. A tunable laser cavity as defined in claim 7, wherein said gain medium has a first gain at said first wavelength and a second gain at said second wavelength, said first and second gains differing from each other;
said first and second fibre Bragg grating segments have respectively a first segment reflectivity and a second segment reflectivity, said first and second segment reflectivities being such that said tunable laser cavity has a substantially constant gain at both said first and second wavelengths.

9. A tunable laser cavity as defined in claim 6, wherein said first reflector first and second portions each include a respective chirped fibre Bragg grating segment.

10. A tunable laser cavity as defined in claim 6, wherein said first reflector first and second portions are each a portion of a chirped fibre Bragg grating.

11. A tunable laser cavity as defined in claim 6, wherein said first wavelength is smaller than said second wavelength.

12. A tunable laser cavity as defined in claim 6, wherein said first wavelength is larger than said second wavelength.

13. A tunable laser cavity as defined in claim 1, wherein said gain medium defines a gain medium first end and a substantially opposed gain medium second end;
said optical resonator includes an optical circulator, said optical circulator including a circulator first port, a circulator second port and a circulator third port, said optical circulator being configured in a manner such that said laser light incoming at said circulator first port is emitted at said circulator second port, said laser light incoming at said circulator second port is emitted at said circulator third port and said laser light incoming at said circulator third port is emitted at said circulator first port, said circulator first port being optically coupled to said gain medium through said gain medium first end, said circulator second port being optically coupled to said reflector and said circulator third port being optically coupled to said gain medium through said gain medium second end; and
said reflector first and second portions are respectively spaced apart from said circulator second port by a reflector first portion-to-circulator distance and a reflector second portion-to-circulator distance, said reflector first portion-to-circulator distance being smaller than said reflector second portion-to-circulator distance.

14. A tunable laser cavity as defined in claim 13, wherein said reflector first and second portions each include a respective fibre Bragg grating segment.

15. A tunable laser cavity as defined in claim 2, wherein said first reflector includes an optical circulator for receiving said laser light from said gain medium and returning said laser light back to said gain medium.

16. A tunable laser cavity as defined in claim 13, wherein said reflector includes a chirped fibre Bragg grating, said chirped fibre Bragg grating being reflective at said first and second wavelengths at two substantially longitudinally spaced apart locations, said tunable laser cavity further comprising a controller for selectively controlling said modulation period as a function of a predetermined tuning curve characterizing a wavelength reflected by said chirped fibre Bragg grating as a function of a longitudinal position along said chirped fibre Bragg grating.

17. A tunable laser cavity as defined in claim 13, wherein said reflector includes a chirped fibre Bragg grating, said chirped fibre Bragg grating being reflective at said first and second wavelengths at two substantially longitudinally spaced apart locations, said chirped fibre Bragg grating defining a variable group delay therealong, whereby changing a wavelength of said laser light produces laser light pulses having different pulse shape characteristics.

18. A tunable laser cavity as defined in claim 17, wherein said pulse shape characteristics include a duration of said laser light pulses.

19. A tunable laser cavity as defined in claim 1, wherein said optical intensity modulator includes an electro-optic modulator.

20. A tunable laser cavity as defined in claim 1, wherein said optical intensity modulator includes a variable attenuation modulator.

21. A tunable laser cavity as defined in claim 1, wherein said gain medium includes a doped gain fibre.

22. A tunable laser cavity as defined in claim 1, wherein said optical resonator, said gain medium and said optical intensity modulator are all polarization-maintaining.

23. A tunable laser cavity as defined in claim 22, further comprising a polariser inserted in said optical resonator for polarizing said laser light.

24. A tunable laser cavity as defined in claim 13, wherein
said laser light includes laser light pulses, said laser light pulses defining a pulse spectrum;
said reflector includes a chirped fibre Bragg grating, said chirped fibre Bragg grating being reflective at said first and second wavelenghts at two longitudinally spaced apart locations, said chirped fibre Bragg grating defining a group delay ripple to group delay ratio, said group delay ripple to group delay ratio defining a ratio spectrum; and
said pulse spectrum and said ratio spectrum being substantially disjoint from each other.

25. A tunable laser cavity as defined in claim 1, wherein said output port includes an optical switch for selectively releasing said laser light from said optical resonator and confining said laser light in said optical resonator.

26. A tunable laser for selectively emitting laser light having a first wavelength and a second wavelength, said tunable laser comprising:
a pump light source for emitting a pump light;
an optical resonator, said optical resonator including a reflector, said reflector including a reflector first portion and a reflector second portion for reflecting respectively said laser light having said first and second wavelengths, said reflector first and second portions being substantially transparent respectively at said second and first wavelengths, said reflector first and second portions being spatially spaced apart from each other such that a first round-trip time of said laser light having said first wavelength in said optical resonator differs from a second round-trip time of said laser light having said second wavelength in said optical resonator;
a gain medium inserted in said optical resonator and optically coupled to said pump light source, said gain medium being responsive to said pump light for converting said pump light to said laser light; and
an optical intensity modulator inserted in said optical resonator for absorbing a portion of said laser light as said laser light propagates back and forth in said optical resonator, said optical intensity modulator having a light absorption coefficient that is modulated with a modulation period, said modulation period being selectively adjustable between a first modulation period value and a second modulation period value, said first and second round-trip times being substantially equal to a respective integer multiple of respectively said first and second modulation period values; and
an output port for releasing said laser light from said optical resonator;
whereby, when said gain medium is pumped with said pump light, modulating said optical intensity modulator at said first modulation period value produces laser light having said first wavelength and modulating said optical intensity modulator at said second modulation period value produces laser light having said second wavelength.

* * * * *